Oct. 8, 1946.     C. A. REED     2,409,067

MEANS AND METHOD FOR MAKING PALATABLE MATERIAL

Filed June 30, 1941     2 Sheets-Sheet 1

INVENTOR.
C. A. REED
BY Dick, Bailey & Fletcher

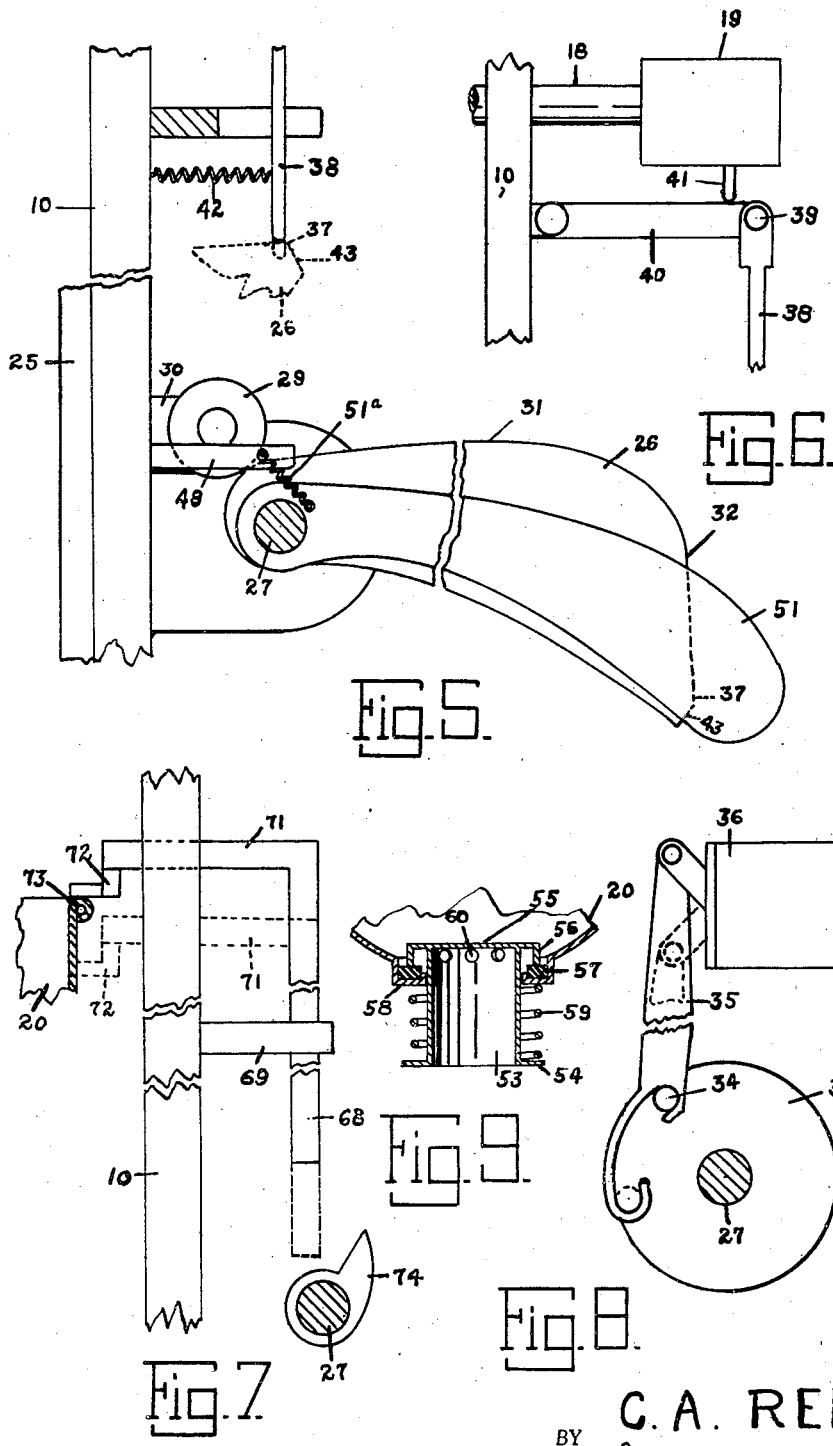

Patented Oct. 8, 1946

2,409,067

UNITED STATES PATENT OFFICE 2,409,067

MEANS AND METHOD FOR MAKING PALATABLE MATERIAL

Claude A. Reed, Omaha, Nebr.

Application June 30, 1941, Serial No. 400,430

22 Claims. (Cl. 99—79)

This invention relates to materials of relatively light weight as compared with their bulk; more specifically it relates to material containing fluid-filled chambers or empty chambers.

In the preparation of malted milks, milk shakes and the like it is the normal practice to place ice-cream, which itself contains substantial quantities of air and the other necessary ingredients in an open receptacle and to then mechanically mix the ingredients together at the same time incorporating therein air derived from the atmosphere above and in the open receptacle.

The quality of malted milks and similar materials depends upon a number of factors. The temperature is important for if not sufficiently cold the drink is too liquid; if it is too cold substantially no flowability exists. Again, the temperature of a malted milk, milk shake or the like materially affects its palatability. The amount of air or other gas mixed into the drink affects its texture in that too little air yields a thin, watery beverage while an over-supply of air makes for foaminess and warm taste. Further, the proportions of the various ingredients is of prime importance in preparing a desirable drink.

In preparing a malted milk according to the usual practice as described above the factors which determine the quality of the drink are either substantially uncontrolled or controlled only in a make-shift manner. The operator normally has no accurate check on the length of time which he permits the mixer to operate and hence the amount of air incorporated into the drink is not closely regulated. The length of time that the drink is under the mixer also materially affects the temperature of the drink, not only due to the direct contact of the container with the atmosphere but also due to the quantity of warm air mixed integrally with the drink. As is well known the operator normally has no way of gauging the exact amount of each ingredient which he is to include in a given drink. The dippers of ice cream may vary in size and the dash of milk may be large or small.

I have invented a process for preparing malted milks, milk shakes, other edibles and even unedible materials containing gas cells or chambers which overcomes all of the disadvantages of the present method of preparing such materials and in addition enables me to prepare large numbers of drinks each of which is substantially uniform as compared with the others. I have also invented a novel machine which I may employ in carrying out my novel process.

It is an object of this invention to provide a novel process for preparing cold foods.

Another object of this invention is to provide a novel process for producing a cold food containing gas.

A still further object of this invention is to provide a novel process of impregnating material with pores or interstices.

Yet another object of this invention is to provide a process for preparing uniform controlled quality materials.

A still further object of this invention is to provide a novel device for use in impregnating a material with pores or interstices.

For illustrative purposes I shall describe my process in connection with preparation of a malted milk. I first select the required ingredients including butter-fat, other milk products, sweetening, flavoring or fruits and malted milk powder and freeze these materials together, either with or without first thoroughly mixing them, and without mixing them with substantial amounts of gas. Normally, for the sake of convenience, proper quantities of these ingredients are frozen together in individual molds of a size suitable to producing one malted milk. If desired the ingredients may all be frozen into a single mass and slabs of suitable size subsequently cut therefrom. These frozen ingredients may be prepared in large quantities at a central source under conditions permitting exact regulation of the amount and quality of each ingredient so that each of the individual molds or slabs will yield a drink of high quality and of quality uniform with the drink produced from each of the other molds or slabs. If the malted milks are consumed at variously located points other than that at which the freezing operation was executed I next distribute the molds or slabs, prepared as heretofore described, in their frozen state to the points of consumption. At a point of consumption I violently agitate a mold in the presence of material, such for example as fluid, under superatmospheric pressure. In the agitating operation it is my theory that the molds are broken up and the ingredients obtain flowability and become impregnated with material under superatmospheric pressure. True or false, I do not wish to be limited herein by any of the theories which I advance. Commonly the step of agitating in the presence of material under pressure is performed in a confined chamber. When this is so the next step in my process comprises emitting the ingredients impregnated with the material under superatmospheric pressure through a restricted orifice structure into the atmosphere. This may be done either while superatmospheric pressure is being supplied to the chamber or when the superatmospheric pressure within the chamber is due only to materials already within the chamber. Upon the completion of the latter operation I have a rich appearing, delicious malted milk containing a suitable number of gas pockets. My theory is that upon encountering reduced pressure the material under superatmospheric pressure expands within the ingredients causing gas pores of substantial size. Clearly the agitating of the ingredients in the presence of material under superatmospheric pressure may be done in any suitable manner and employing any suitable type of apparatus. The exposure to reduced pressure also may be accomplished by any suitable manner and/or means. For example, the superatmospheric pressure in the agitating chamber may simply be released. Obviously the step of transporting the frozen ingredients to a point removed from the point of freezing is not inherent in my process. In describing my process I have referred to material under superatmospheric pressure. While normally the final drink is impregnated with pores filled with gas, it is by no means prerequisite that the material under superatmospheric pressure be in a gaseous state at the time it is introduced. It is well known that gases under superatmospheric pressure may be in the liquid or solid state. In freezing the ingredients it is not absolutely essential to my invention that they be frozen together. Two or more may be frozen together or each may be frozen separately. Clearly it is not essential that some of the ingredients be frozen at all. If desired a part of the ingredients, such for example as the milk products part may be frozen, either separately or together, and delivered to the point of consumption where the retailer may supply the remainder of the ingredients from his own stock. If the ingredients are not all first frozen together, in performing the agitating step, the ingredients may all first be placed together or only a part of them placed together and subjected to agitation. If only a part are agitated, the remainder may be added subsequently. Obviously, certain steps in my process may be employed without employing other steps. For example, the ingredients may be originally prepared in accordance with my invention but not agitated in the presence of material under superatmospheric pressure. They may be simply agitated to prepare a non-bulky drink. Again, I may prepare a delicious drink by agitating materials in the presence of material under superatmospheric pressure which have not been originally prepared in the manner which I have described as preferred. For example, an individual retailer may place the ingredients of a malted milk together in the manner to which he is accustomed and then proceed to agitate them in the presence of material under superatmospheric pressure rather than in an open container as is his present common practice. After completing the agitating step he may emit the materials through a restricted orifice structure or not, as he desires. While I have described my invention in connection with the preparation of malted milks, milk shakes, and the like, it is by no means limited thereto. My process or certain steps thereof may be employed in preparing foods which are not low temperature and it or certain of its steps may even be used in preparing non-edible material having a porous structure. The content of the pores, cells, or interstices of products prepared in accordance with my invention or certain steps thereof is not material. It may be gas, bulky liquid, or nothing.

The term "agitation" as used in the foregoing description of my novel process is intended to include other methods of comminuting in addition to those entailing agitation primarily.

In executing my novel process I may employ a machine which I have invented and for a clear and concise understanding of which reference should be made to the accompanying drawings forming a part of this specification, in which Fig. 1 is a front elevation of one embodiment of my invention.

Fig. 5 is a fragmentary side elevation of my device showing certain cam structure and operatively related parts.

Fig. 6 is a fragmentary side elevation showing the pressure control.

Fig. 7 is a fragmentary side elevation showing a safety control.

Fig. 8 is a side elevation of the prime mover control.

Fig. 9 is a cross-sectional view of the false bottom of a mixing cup showing a control valve.

Figure 1:
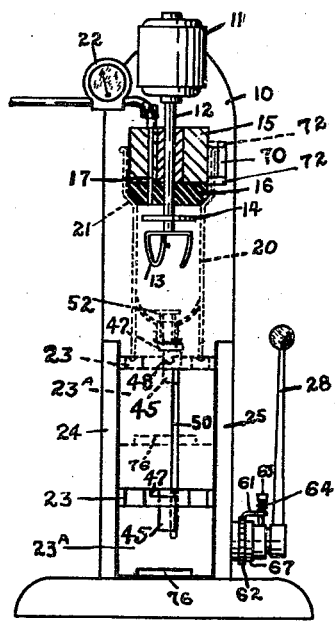
Figure 2:
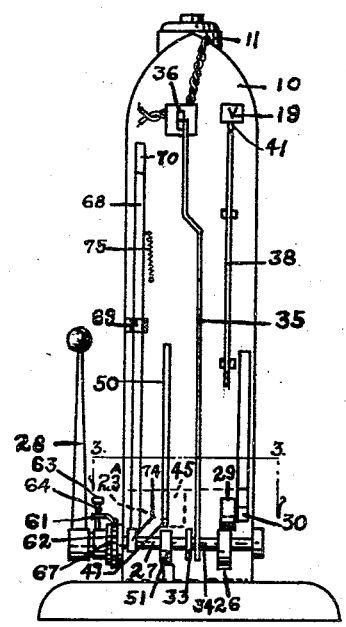
Fig. 2 is a rear elevation of the same machine.
Figure 4:
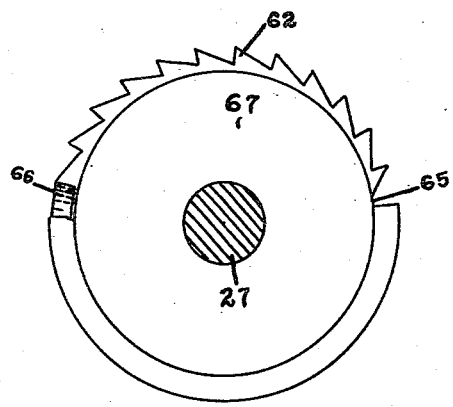
Fig. 4 is a side elevation of a rachet and adjacent shoulder employed in my device, a rotatably received shaft being shown in cross-section.
Figure 3:
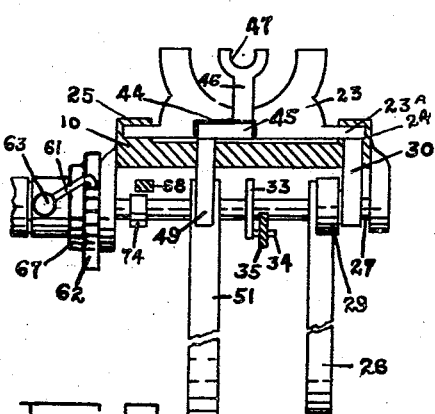
Fig. 3 is a sectional view taken on line 3—3 of Fig. 2.

Referring now more specifically to the drawings I have used the number 10 to designate the main frame slab. 11 is a prime mover to rotate the shaft 12 on the lower end of which the blades 13 are mounted. A splash guard is shown at 14. On the lower end of the bearing support 15 in which the shaft 12 is rotatably received is mounted the gasket or other seal 16. The conduit 17 which exhausts beneath the seal 16 is in communication with a source of material, normally fluid, under pressure, through the lead pipe 18 (Fig. 6). A valve 19 controls the flow of the material under superatmospheric pressure through the conduit 17 and into the cup 20 shown in dotted lines in Fig. 1 as engaging the gasket 16 with its shoulders 21, thereby effecting a seal. The gauge 22 suitably connected serves to indicate the amount of pressure supplied when the valve 19 is open. The cup 20 rests upon a supporting bracket 23 which is itself supported on the vertical plate 23—A. The plate 23—A is adapted to travel vertically in engagement with the guides 24 and 25 from the lowered position shown in full lines in Fig. 1 to the elevated position shown in broken lines in Fig. 1. When in the elevated position the cup is in the position shown by the broken lines in Fig. 1 and is in sealing engagement with the gasket 16. In raising the bracket 23 I employ a cam 26, keyed to the shaft 27. The shaft 27 is manually rotatable by means of the lever 28. In Fig. 5 the cam 26 is shown in its lowered position or inoperative position. As the shaft 27 is rotated counter-clockwise the cam 26 rises, engaging the rotatably mounted wheel 29 which is operatively connected to the plate 23—A by means of the connecting arm 30. As the cam 26 rises the wheel 29 rotatably engaging the cam's broad surface 31 is forced to travel upwardly, carrying with it the supporting bracket 23. The construction is such that as the wheel 29 reaches the flat portion 32 of the cam the cup 20 has been raised to such an extent that a seal has been effected with the gasket 16. As the cam 26 rotates further counter-clockwise the wheel 29 travels along the surface 32 of the cam, maintaining the seal. Keyed also to the shaft 27 is the disc 33 bearing the lug 34 which engages a connecting rod 35 operatively connected to the switch 36 of the prime mover 11. When the lug 34 engages the arm 35 as shown in full lines in Fig. 8 it operates to close the switch 36. When the lug 34 engages the member 35 as shown in the dotted line in Fig. 8 it serves to open the switch 36. The arrangement is such that the lug 34 engages the member 35 to close the switch 36 at substantially the same time as the wheel 29 travelling on the cam 26 effects a seal between the cup 20 and the gasket 16. The exact instant comparatively is not essential but it is desirable that these operations occur at somewhat nearly the same time.

As the cam 26 continues counter-clockwise rotation after the seal between the cup 20 and the gasket 16 has been effected its outer nose portion 37 engages, as shown in dotted lines in Fig. 5, the rod 38. The rod 38 is pivotally mounted at 39 on the pivotally mounted arm 40. The upper surface of the arm 40 engages the plunger-rod 41 of the valve 19. Engagement of the rod 38 by the cam 26 in the manner indicated causes the rod 38 to be raised, as shown by the dotted lines in Fig. 5, thereby raising the plunger-rod 41 causing the valve 19 to be opened. It is preferable but not necessary that the action opening the valve 19 occur after the prime mover switch 36 has been closed. Further counter-clockwise rotation of the cam 26 causes the said cam to disengage the rod 38, permitting the valve 19 to close. The mounting of the rod 38 is such that its lower end may swing outwardly somewhat from the main frame slab 10. A spring 42 yieldably limits this outward swing. By this construction the opening of the valve 19 as a result of engagement of the rod 38 of the cam 26 as said cam rotates clockwise to its starting position is averted. On the return rotation of the cam 26 the rod 38 engages the portion 43 of the cam and is forced outwardly as the cam continues clockwise rotation instead of being vertically displaced as in the counter-clockwise rotation of the cam. When the rod 38 finally slips from the portion 43 of the cam 26 and is returned to its normal position by the spring 42 and the nose 37 of the cam 26 is past its high point of rotation and consequently does not operate to raise the rod 38 and open the valve 19.

Slidably mounted in the channel 44 in the bracket 23 and plate 23—A is the bar 45. At the upper end of the bar 45 on its forward face the arm 46 having the concave head 47 is mounted. When in normal position a portion of the arm 46 rests in the recess 48 in the bracket 23. Adjacent the lower end of the slidable bar 45 on its rear face the arm 49 is mounted. The arm 49 extends through the slot 50 in the frame slab 10 to the rear of my device where its end portion is at times in position for engagement with the cam member 51 locked with the shaft 27. The arm 49 is slidable in the slot 50 and the bar 45 together with the attached arms 46 and 49 travels upwardly with the bracket 23 as it is raised, by the cam 26 as heretofore described, due to engagement of the arm 46 by the bracket 23. The arm 46 remains in its normal position in the recess 48 in the bracket 23 through all phases of the counter-clockwise rotation of the shaft 27 up to and including that at which the rod 38 disengages the nose 37 of the cam 26 permitting the valve 19 to close. After the nose 37 of the cam 26 has passed the rod 38 the cam 51 engages the arm 49 causing said arm 49 together with the slidable bar 45 and the arm 46 to rise, whereby the concave head portion 47 of the arm 46 is caused to open the valve 52 in the bottom of the cup 20. The spring 51—A serves to aid in returning the arm 49 and the bracket 23 and members connected thereto to lowered positions. One embodiment of the valve 52 is shown in detail in Fig. 9 and consists in a cylinder 53 having at its bottom end an out-turned flange 54 and having a plate 55 closing its top end. The plate 55 has a downwardly turned peripheral flange 56 which engages a gasket 57 seated in a suitable support 58 in the bottom of the cup 20. A spring 59 pressing with its top against the bottom of the cup 20 and with its bottom against the flange 54 tends to keep the valve normally closed. Openings 60 are provided in the cylinder 53 to provide means of escape for material within the cup 20 when the flange 56 is raised out of engagement with the gasket 57 by external force. In order to prevent clockwise rotation of the shaft 27 after a counter-clockwise cycle has been started and before it has been completed, I provide a pawl 61 which rotates with the shaft 27 and which engages a stationary ratchet 62. The pawl 61 is pivotally mounted on the spindle 63 and the spring 64 tends to hold the pawl 61 in engagement with the ratchet 62. At the beginning of the ratchet 62 the cutaway 65 is provided and at the end of the ratchet a guide is provided as at 66 for causing the pawl 61 to disengage the ratchet 62 by causing it to pivot on the spindle 63 forcing it out onto the adjacent shoulder 67 where it may slide as the shaft 27 rotates to its starting position. On reaching this point the spring 64 causes the pawl 61 to slip into the cutaway 65 where it is ready for the commencement of another cycle of rotation. In order to insure against my device being put through a complete operation without the cup 20 being on the support 23, I have provided a safety device which is illustrated in detail in Fig. 7. To the rear of the slab 10 I have provided an elongated rod 68. Extending slidably through the slot 70 in the slab 10 is the arm 71 attached at one of its ends to the top portion of the rod 68 and having secured to its other end an arm structure 72. The arm structure 72 is so formed and so disposed that a portion thereof protrudes sufficiently from the front surface of the slab 10 to engage the rim 73 of the cup 20 as said cup travels upwardly to form a seal with the gasket 16. On the shaft 27 a lug 74 is provided locked to said shaft and so positioned thereon that if counter-clockwise rotation of the shaft 27 is continued beyond a certain point said lug 74 will engage the lower end of the rod 68 thereby halting further rotation of the shaft 27, provided that the said lower end of the rod 68 has not been raised beyond the reach of said lug 74 by the time said lug approaches said rod. The arm 71 is adapted to travel up and down in the slot 70. The construction is such that as the shaft 27 is rotated raising the bracket 23 if a cup 20 is in position on said bracket the top rim 73 of said cup will engage the arm structure 72 and raise it together with the rod 68 out of reach of the lug 74 before said lug reaches said rod 68. If no cup is in position as the rod 27 is rotated the lug 74 engages the lower end of the rod 68 halting rotation of the rod 27 before the switch 36 has been closed or the valve 19 opened. A spring 75 is provided tending to maintain the rod 68 in its lowered position.

The operation of my device is as follows:

The operator places in the cup 20 ingredients of the desired product. These ingredients may have been frozen together in accordance with my novel process or they may be simply other materials, such for example as ingredients taken from bulk stocks by the operator. The cup 20 is next placed upon the supporting bracket 23 and the lever 28 is rotated in counterclockwise direction. The rotation of the lever 28 causes the shaft 27 and hence the cam 26 to rotate. As the cam 26 rotates, its surface 31 engages the rotatable wheel 29, causing said wheel to rise with the result that the connecting arm 30, plate 23A, bracket 23, and cup 20 are raised to a position such that the shoulders 21 of the cup 20 engage the gasket 16 and form a seal therewith. As it travels upwardly the top rim 73 of the cup 20 engages the arm structure 72, raising the bar member 68 out of the reach of the lug 74, thus permitting complete operation of the machine without interference by the safety device. At substantially the same point of rotation of the shaft 27 as that at which the cup 20 forms a seal with the gasket 16, the lug 34 carried by the disc 33, which is locked to said shaft 27 and rotates therewith, engages the arm 35 causing it to close the switch 36, starting the motor 11 which drives the shaft 12 and blades 13. The rotating blades 13 agitate the materials placed within the cup 20 by the operator, and if those materials are of a solid nature, the blades 13 serve also to chop or comminute these materials. As counterclockwise rotation of the shaft 27 is continued, the portion 37 of the cam 26 engages the rod 38, causing said rod to be raised upwardly, opening the valve 19 and permitting material under superatmospheric pressure to travel through the lead pipe 18 and conduit 17 into the sealed cup 20. In practice I normally use nitrous oxide gas for my material under superatmospheric pressure; nevertheless as heretofore stated, any suitable material under superatmospheric pressure may be employed. Normally the rotation of the rod 27 is halted momentarily while the rod 38 is in engagement with the portion 37 of the cam 26 in order to permit a substantial quantity of material under superatmospheric pressure to be introduced into the cup 20, whereby a superatmospheric pressure is built up within said cup. The blades 13 together with the velocity and/or pressure of the incoming materials under superatmospheric pressure serve to impregnate the ingredients originally placed within the cup 20 by the operator with the material under superatmospheric pressure. Further rotation of the shaft 27 causes the cam 26 to disengage the rod 38, permitting the valve 19 to close with the result that the materials under superatmospheric pressure supply is cut-off. After the valve 19 has been closed, continued rotation of the shaft 27 brings the cam 51 into engagement with the arm 49, raising said arm and consequently raising also the arm 46 causing the head 47 to engage the valve 52 in the bottom of the cup 20 to open the same. Opening of the valve 52 permits contents of the cup 20 to flow into a suitable receptacle which may be supported on the platform 76. The product coming from the valve 52 will normally be of substantial bulk, having in its body in any gas-filled pores, interstices or cells. During the return or clockwise rotation of the shaft 27, the various members of the device return to their original positions; the cup 20 disengages the gasket 16 breaking the seal and lowers to a position such that it may be removed from the support 23. Preferably the prime mover 11 is not stopped until the blades 13 have had an opportunity to clean themselves somewhat due to rotation out of engagement with the contents of the cup 20.

If desired, a paper cup suitably reinforced may be substituted for the cup 20. It is not essential to a satisfactory operation of my device that the valve 52 and valve release construction, including the head 47, be incorporated. The contents of the cup 20 will expand to a very substantial extent upon being subjected to lower pressures, even though they are not emitted through a restricted orifice structure.

In this specification and claims, I have employed the term "orifice structure" to include one or more orifices. "Food" has been used herein to include drinks and is intended to signify any material which is consumed by either man or animal.

In addition to the very numerous alterations and omissions which may be made in the precise embodiment of my invention which I have herein described while yet obtaining the general desirable results produced by my device, very material changes in the construction shown may be made. Mechanisms adapted to perform one or more of the functions performed by my device may be operated individually or by controls operating one or more other mechanisms. Clearly the device may be designed to eliminate manual operation. Basically my device involves a means adapted at least at times to contain material under superatmospheric pressure, means for introducing material under superatmospheric pressure into said containing means, and means for impregnating material within said containing means with material introduced through said means for introducing material under superatmospheric pressure. A great many different mechanical constructions may be adopted to produce this structure. The container may have a screw type seal and may be moved in an arc or otherwise in positioning it and/or during the impregnating operation. Obviously in the precise structure which I have shown the valve 19 may be left open during the process of emitting the contents of the cup 20 through the valve 52 if such is desired. Such a construction may be followed in other devices also. Among the numerous alterations which may be made in the particular embodiment which I have shown for illustrative purposes, are variations in the means for raising the cup, variations in the cup itself and the means whereby it is sealed, variation in or elimination of the safety device, variation in the prime mover's location and in the cutting blades, variation in the means for controlling the operation of the prime mover, variation in the valve and conduits therefor for the material under superatmospheric pressure and in the contents for said material and in their location, variation in the means for obtaining the contents of the cup, variation or elimination of the means for controlling reverse movement of various means, and variation in the means for returning the various parts to starting position. My device may be employed in producing materials other than foods.

In the production of malted milks and the like, texture is a very important factor. Texture is normally spoken of in the terms of roughness or smoothness and is determined in a large part by the size of the ice crystals in the food. The size of ice crystals are limited in the main by use of stabilizer in the formula and by controlled fast freezing. Inasmuch as it is not desirable that the ice crystals be either too large or too small, accurate regulation of both freezing and amount of stabilizer used is desirable. By my novel process, I am enabled to control to a very high degree the texture of my final product, for by preparing my base at a centralized plant where equipment is available on a large scale, I may regulate very accurately the amount of stabilizer employed, the freezing temperature, and the relationship of these two factors one to the other. The freezing temperature may be kept constant for successive batches. Employing my novel process, I am able to produce a standard product or a product of uniform quality in successive operations and to market a uniform product at widely spaced points of consumption. Especially is the latter true when a device of the type which I have described herein or a modification thereof is employed at the point of consumption for completing the preparation of the product.

A device constructed according to my invention provides several distinct advantages in the preparation of a product. For example, in the preparation of a malted milk it enables the completion of the drink in a shorter length of time for the gaseous impregnation is accomplished under superatmospheric pressure. Moreover, the contents being substantially sealed within the container, very violent agitation may be employed without splashing the ingredients out of the container. Rapid mixing of the malted milk aids in the procurement of a cold drink and a thicker drink, characteristics each of which are desirable in a high quality malted milk. Fast mixing reduces the opportunity for the drink to pick up heat from the surrounding atmosphere. A cold drink is naturally thicker than a warmer drink of the same consistency. If desired, my device may be so equipped that the material under superatmospheric pressure is cooled before being introduced into the container, thus providing for an even colder product. Inasmuch as the pressure of the material under superatmospheric pressure may be regulated and kept uniform for successive operations, it is possible to produce successively a great number of drinks all of which are of substantially the same quality. With my device, it is only a matter of a few seconds between the time that the ingredients are placed in the cup and the time at which they are ready to be consumed as a finished drink. This being true, the operator does not have an opportunity to leave the mixer for varying intervals of time permitting different amounts of gas to be incorporated in successive drinks. The mixing period and the period during which material under superatmospheric pressure is being introduced are subject to being rigidly controlled in my device. Further, my device enables the production of a drink of equal thickness while yet employing less cream. Therefore, it enables the production of an economical drink. It accomplishes this effect in part by its rapid mixing. If ingredients are employed which have been frozen in accordance with my novel process, even greater economy may be effected for all of the ingredients, including the milk, being cold, the drink is necessarily thicker for an equal amount of viscosity increasing ingredients.

I have described certain aspects of my invention for illustrative purposes, but inasmuch as one skilled in the art will be able to make numerous modifications and variations in the specific details which I have mentioned, and this without departing from the spirit and scope of my invention. I wish to be limited herein only by the appended claims.

I claim:

1. The process of preparing a lacteal food comprising freezing a plurality of the ingredients of said food into a solid mass, comminuting, mixing and impregnating ingredients of said food, including said solid mass, in a mixing zone with a gaseous material under superatmospheric pressure until a flowable mixture results, and releasing said flowable mixture to atmospheric pressure.

2. The process of preparing a lacteal food comprising freezing a plurality of the ingredients of said food into a solid mass, comminuting, mixing, and impregnating ingredients of said food, including said solid mass, in a mixing zone with a gaseous material under superatmospheric pressure until a flowable mixture results and removing said flowable mixture from the mixing zone to atmospheric pressure.

3. The process of preparing a lacteal food comprising freezing a plurality of the ingredients of said food into a solid mass, transporting said solid mass to a mixing zone, comminuting, mixing and impregnating ingredients of said food, including said solid mass, in said mixing zone with a gaseous material under superatmospheric pressure until a flowable mixture results, and releasing said flowable mixture to atmospheric pressure.

4. The process of preparing a lacteal food comprising freezing a plurality of the ingredients of said food into a solid mass, transporting said solid mass to a mixing zone, comminuting, mixing and impregnating ingredients of said food, including said solid mass, in said mixing zone with a gaseous material under superatmospheric pressure until a flowable mixture results, and removing said flowable mixture from the mixing zone to atmospheric pressure.

3. The process of preparing a lacteal food comprising freezing the ingredients of said food into a solid mass, comminuting, mixing and impregnating said ingredients in a mixing zone with a gaseous material under superatmospheric pressure until a flowable mixture results, and releasing said flowable mixture to atmospheric pressure.

6. The process of preparing a lacteal food comprising freezing the ingredients of said food into a solid mass, comminuting, mixing and impregnating said ingredients in a mixing zone with a gaseous material under superatmospheric pressure until a flowable mixture results, and removing said flowable mixture from the mixing zone to atmospheric pressure.

7. The process of preparing a lacteal food comprising freezing a plurality of the ingredients of said food into a solid mass, comminuting, mixing and impregnating ingredients of said food, including said solid mass, in a mixing zone with a gaseous material under superatmospheric pressure until a flowable mixture results, and releasing said flowable mixture from said mixing zone through an orifice.

8. The process of preparing an edible material comprising freezing a plurality of the ingredients of said edible material into a solid mass, comminuting, mixing and impregnating ingredients of said edible material, including said solid mass in a mixing zone with a gaseous material under superatmospheric pressure until a flowable mixture results, and releasing said flowable mixture to atmospheric pressure.

9. The process of preparing an edible material comprising freezing a plurality of the ingredients of said edible material into a solid mass, comminuting, mixing and impregnating ingredients of said edible material, including said solid mass, in a mixing zone with a gaseous material under superatmospheric pressure until a flowable mixture results, and removing said flowable mixture from the mixing zone to atmospheric pressure.

10. The process of preparing an edible material comprising freezing a plurality of the ingredients of said edible material into a solid mass in an amount suitable for an individual serving, comminuting, mixing and impregnating ingredients of said edible material, including said solid mass, in a mixing zone with a gaseous material under superatmospheric pressure until a flowable mixture results, and removing said flowable mixture from the mixing zone to atmospheric pressure.

11. The process of preparing a lacteal food comprising freezing the ingredients of said food into a solid mass, the proportion of each of said ingredients being of a quantity appropriate for the preparation of an individual serving of said food, comminuting, mixing and impregnating said ingredients in a mixing zone with a gaseous material under superatmospheric pressure until a flowable mixture results, and releasing said flowable mixture to atmospheric pressure.

12. The process of preparing a lacteal food comprising freezing a plurality of the ingredients of said food together, passing said ingredients to a mixing zone, chopping, mixing and impregnating said ingredients in said mixing zone with a gaseous material under superatmospheric pressure, and removing said ingredients from said mixing zone to atmospheric pressure.

13. A device of the class described comprising an elongated support structure, a container, means for supporting said container, reciprocatably mounted upon said elongated support structure for traveling said container back and forth lengthwise of said elongated support structure, a comminuting blade mounted on said elongated support structure and aligned with the path of travel of said container, a closure for said container also aligned with the path of travel of said container and located to the remote side of said blade with reference to said reciprocatable container support means, whereby movement of said latter means in one direction places said container in receiving relationship to said blade and in sealing engagement with said closure, and means for introducing gaseous material under superatmospheric pressure into said container.

14. A device of the type described comprising an elongated support structure, means for supporting a container, reciprocatably mounted upon said elongated support structure for traveling said container back and forth lengthwise of said elongated support structure, a blade mounted on said elongated support structure and aligned with the path of travel of said container, a closure for said container also aligned with the path of travel of said container and located to the remote side of said blade with reference to said reciprocatable container support means, whereby movement of said latter means in one direction places said container in receiving relationship to said blade and in sealing engagement with said closure, and means for introducing gaseous material under superatmospheric pressure into said container.

15. A device of the type described comprising an elongated support structure, means for supporting a container, reciprocatably mounted upon said elongated support structure for traveling said container back and forth lengthwise of said elongated support structure, a blade mounted on said elongated support structure and aligned with the path of travel of said container, a closure for said container also aligned with the path of travel of said container and located to the remote side of said blade with reference to said reciprocatable container support means, whereby movement of said latter means in one direction places said container in receiving relationship to said blade and in sealing engagement with said closure, means for introducing gaseous material under superatmospheric pressure into said container, and a single control for operating the said blade and the said reciprocatable container support means.

16. A device of the class described comprising an elongated support structure, a blade rotatably mounted adjacent to one end of said support structure, closure means mounted adjacent the same end of said support structure, a container, a movable support for said container disposed further from said end along the length of said support structure, means for moving the container and blade into operative relationship and for engaging said container with said closure means whereby said container is sealed, means for introducing gaseous material under superatmospheric pressure into said container, pressure control means for exposing the contents of said container to substantially atmospheric pressure, and a single control for operating the said blade, the said pressure control means, and the said means for moving the container and blade into operative relationship and for engaging said container and said closure means.

17. A device of the type described comprising an elongated support structure, means for supporting a container, reciprocatably mounted upon said elongated support structure for traveling said container back and forth lengthwise of said elongated support structure, a comminuting blade mounted on said elongated support structure and aligned with the path of travel of said container, a closure for said container also aligned with the path of travel of said container and located to the remote side of said blade with reference to said reciprocatable container support means, whereby movement of said latter means in one direction places said container in receiving relationship to said blade and in sealing engagement with said closure, means for introducing gaseous material under superatmospheric pressure into said container, means for exposing the contents of said container to substantially atmospheric pressure, and a single control for operating the said blade, the said reciprocatable container support means, the said means for introducing gaseous material under superatmospheric pressure and the said means for exposing the contents of said container to substantially atmospheric pressure.

18. A device of the type described for use with a receptacle having a discharge valve adjacent to its bottom comprising, a vertically disposed frame, receptacle closure means mounted upon said frame, blade structure beneath said closure means supported from said frame, a support for said receptacle vertically displaceable upon said frame adapted to move said receptacle into and out of engagement with said closure means, movement into engagement with said closure means resulting in placing said receptacle in receiving relationship to said blade, means mounted on said frame for driving said blade, means for introducing gaseous material under superatmospheric pressure into said receptacle when the latter is in engagement with said closure means, a control mounted on said frame for said blade driving means, a control on said frame for said means for introducing gaseous material under superatmospheric pressure, means movably mounted on said frame for opening said receptacle discharge valve, a rotatable member operatively connected to said receptacle support, a master control shaft rotatably mounted on said frame, a cam on said master control shaft adapted to engage said rotatable member to raise said receptacle support and adapted, after said receptacle support has been raised to a position such that said receptacle supported thereon is in engagement with said closure means, to actuate said control for the means for introducing gaseous material under superatmospheric pressure into said receptacle, means on said master control shaft for operating the control for said blade driving means, a second cam on said master control shaft for actuating the said receptacle discharge valve opening means, and means for rotating said master control shaft.

19. A device of the type described for use with a receptacle comprising a vertically disposed frame, receptacle closure means mounted upon said frame, a support for said receptacle vertically displaceable upon said frame adapted to move said receptacle into and out of engagement with said closure means, movement into engagement with said closure means resulting in placing said receptacle in receiving relationship to said blade, a rotatable member operatively connected to said receptacle support, a master control shaft rotatably mounted on said frame, a cam on said master control shaft arranged to engage said rotatable member at certain positions of rotation of said master control shaft to raise said receptacle support, and means for rotating said master control shaft.

20. A device of the type described for use with a receptacle having a discharge valve adjacent to its bottom comprising, a vertically disposed frame, receptacle closure means mounted upon said frame, blade structure beneath said closure means supported from said frame, a support for said receptacle vertically displaceable upon said frame adapted to move said receptacle into and out of engagement with said closure means, movement into engagement with said closure means resulting in placing said receptacle in receiving relationship to said blade, means mounted on said frame for driving said blade, means for introducing gaseous material under superatmospheric pressure into said receptacle when the latter is in engagement with said closure means, a control mounted on said frame for said blade driving means, a control on said frame for said means for introducing gaseous material under superatmospheric pressure, means movably mounted on said frame for opening said receptacle discharge valve, a rotatable member operatively connected to said receptacle support, a master control shaft rotatably mounted on said frame, a cam on said master control shaft adapted to engage said rotatable member to raise said receptacle support and adapted, after said receptacle support has been raised to a position such that said receptacle supported thereon is in engagement with said closure means, to actuate said control for the means for introducing gaseous material under superatmospheric pressure into said receptacle, means on said master control shaft for operating the control for said blade driving means, a second cam on said master control shaft for actuating the said receptacle discharge valve opening means, means for rotating said master control shaft, and a safety means for preventing complete operation of the device without a receptacle in place on said receptacle support including construction movably mounted on said frame and partially disposed in the path of said receptacle as it travels toward said closure means, adapted to be moved by said receptacle, and a projection on said master control shaft aligned to engage a portion of said construction to prevent continued rotation of said master control shaft if said construction has not been moved by a receptacle by the time said shaft has reached a predetermined position of rotation.

21. A device of the type described for use with a receptacle comprising, a vertically disposed frame, receptacle closure means mounted upon said frame, blade structure beneath said closure means supported from said frame, a support for said receptacle vertically displaceable upon said frame adapted to move said receptacle into and out of engagement with said closure means, movement into engagement with said closure means resulting in placing said receptacle in receiving relationship to said blade, means for introducing gaseous material under superatmospheric pressure into said receptacle when the latter is in engagement with said closure means, a control on said frame for said means for introducing gaseous material under superatmospheric pressure, a master control shaft rotatably mounted on said frame, a cam on said master control shaft aligned to actuate said control for the means for introducing gaseous material under superatmospheric pressure at a predetermined position of rotation of said master control shaft, and means for rotating said master control shaft.

22. In a device for preparing flowable food from ingredients at least one of which are frozen, a receptacle adapted to contain said ingredients together with material under superatmospheric pressure and a pressure release means for said receptacle comprising a valve seat on the interior of said receptacle about an orifice therein, a tubular member longitudinally slidably received in said orifice having one of its ends normally disposed within said receptacle and the other of its ends normally disposed outside of said receptacle and having an orifice adjacent that end disposed within said receptacle, a closure for said latter end, means projecting laterally from that portion of said tubular member which is contained within said receptacle adapted to at times at least indirectly engage said valve seat to provide a seal for said receptacle, and yieldable means for biasing said tubular member in a position of its longitudinally slidable motion such that said laterally projecting means is normally held in sealing position.

CLAUDE A. REED.